United States Patent
Volokin

(12) 
(10) Patent No.: US 11,163,920 B2
(45) Date of Patent: Nov. 2, 2021

(54) METHOD FOR MODELING STRUCTURE IN VARIABLE TERRAIN

(71) Applicant: ARCH-INTELLIGENCE LTD, Haifa (IL)

(72) Inventor: Ilya Volokin, Haifa (IL)

(73) Assignee: ARCH-INTELLIGENCE LTD, Haifa (IL)

(*) Notice: Subject to any disclaimer, the term of this patent is extended or adjusted under 35 U.S.C. 154(b) by 315 days.

(21) Appl. No.: 16/414,323

(22) Filed: May 16, 2019

(65) Prior Publication Data

US 2020/0364311 A1    Nov. 19, 2020

(51) Int. Cl.
  *G06F 30/13*     (2020.01)
  *G06F 111/02*    (2020.01)
  *G06F 111/10*    (2020.01)

(52) U.S. Cl.
  CPC .......... *G06F 30/13* (2020.01); *G06F 2111/02* (2020.01); *G06F 2111/10* (2020.01)

(58) Field of Classification Search
  CPC ...... G06F 30/13; G06F 30/00; G06F 2111/10; G06F 2111/02; G06F 30/17
  USPC .......................................................... 703/1
  See application file for complete search history.

(56) References Cited

U.S. PATENT DOCUMENTS

2015/0130797 A1*  5/2015  Chen ..................... G06T 17/05
                                                        345/420

FOREIGN PATENT DOCUMENTS

| CN | 105989198 A | 10/2016 |
| CN | 107066758 A | 8/2017 |
| CN | 108763775 A | 11/2018 |
| CN | 109741451 A | 5/2019 |

OTHER PUBLICATIONS

Wu, Chih-Ming et al., "An Empirical Study on Planning and Design Collaboration of Urban Railway Construction Bridge and Culvert Project on BIM", 2018, IEEE International Conference on Advanced Manufacturing (IEEE ICAM 2018), IEEE. (Year: 2018).*

* cited by examiner

*Primary Examiner* — Cedric Johnson
(74) *Attorney, Agent, or Firm* — William H. Dippert; Laurence A. Greenberg; Werner H. Stemer

(57) ABSTRACT

A method for modeling a structure in variable terrain uses a building information modeling system configured to acquire a terrain representation, to obtain a representation of the structure having a length, and to model the structure into the terrain. The method comprises determining an unfold of the structure, determining a top and bottom lines of the unfold, editing the unfold to yield an edited unfold, and repeating the modeling the structure into the terrain based on the edited unfold.

10 Claims, 6 Drawing Sheets

$h_{01} = Z_{L0} - Z_{L1}$   $h_S$ = preset
$h_{02} = Z_{L0} - Z_{L2}$   $\Delta h = h_s - h_{02}$
$h_{03} = Z_{L0} - Z_{L3}$   $P_0 = L_2 - L_0 + (L_3 - L_2)/h_{23} * \Delta h$
$h_{23} = Z_{L2} - Z_{L3}$

METHOD FOR MODELING STRUCTURE IN VARIABLE TERRAIN

TECHNICAL FIELD

The present disclosed subject matter relates to building information modeling (BIM). More particularly, the present disclosed subject matter relates to, but not exclusively, to a method for modeling structure in variable terrain.

BACKGROUND

The use of computers and computer aided design (CAD) to design structures has become a common tool in the building industry. Their use enables the designers to design the whole structure prior to the start of construction generally with a reduced probability of design mistakes. Nevertheless, mistakes are often made, although they may be very subtle, and are not discovered until much later in the construction. Correcting the mistakes commonly involves some reconstruction, and more than the expected amount of material and possible additional construction time. Building information modeling (BIM) is a digital representation characterizing three-dimensional of any given physical space. The BIM allows architects, engineers, and builders to explore a project digitally before it is built. Coordinated, reliable information is used throughout the process to design innovative projects, more accurately visualize appearance for better communication, and simulate real-world performance for better understanding of important characteristics such as cost, scheduling, and environmental impact.

BRIEF SUMMARY

According to a first aspect of the present disclosed subject matter, a method for modeling a structure in variable terrain using a building information modeling system configured to acquiring a terrain representation; obtaining a representation of the structure having a length and modeling the structure into the terrain, the method comprising: determining an unfold of the structure; determining a top and bottom lines of the unfold; editing the unfold to yield an edited unfold; and repeating the modeling the structure into the terrain based on the edited unfold.

In some exemplary embodiments, the terrain and the structure representation comprise two- and three-dimension graphical and numeric representations.

In some exemplary embodiments, the modeling the structure into the terrain further comprise two- and three-dimension graphical and numeric representations of the structure and the terrain.

In some exemplary embodiments, the terrain is an area selected from the group consisting of landscape; sidewalk; road, existing structure; and any combination thereof.

In some exemplary embodiments, the terrain representation is selected from the group consisting of records of geographic information system; global positioning system, photogrammetry; computer aided design files; and any combination thereof.

In some exemplary embodiments, the structure is digital representation of a civil engineering structure selected from the group consisting of wall; floor; ceiling; stairs; building foundation; fence; road; sidewalk; bridge; and any combination thereof.

In some exemplary embodiments, the determining an unfold further comprises segmenting the length of the structure based on topography triangulation configured to divide the terrain that is adjacent to the structure into sub-sections, and wherein the sub-sections are comprised of sub-sections on each side of the structure.

In some exemplary embodiments, the determining a top and bottom lines of the unfold is determining an elevation of a top line and a bottom line of the structure at each segment, and wherein the determining an elevation takes into consideration elevations of the terrain that is adjacent to the structure.

In some exemplary embodiments, the editing the unfold is editing the structure by editing the unfold of the structure, and wherein the editing forms an edited structure.

In some exemplary embodiments, the editing structure is selected from the group consisting of: changing physical detentions of the structure; adding an additional structure to the structure; omitting a portion of the structure; and any combination thereof.

In some exemplary embodiments, the repeating the modeling the structure into the terrain based on the edited unfold is reconstructing the modeling with the edited structure, and wherein reconstructing the modeling is a digital representation outcome selected from the group consisting of: two-dimensional graphic representation; three-dimensional graphic representation; numeric representation; and any combination thereof.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION

Figure 1:
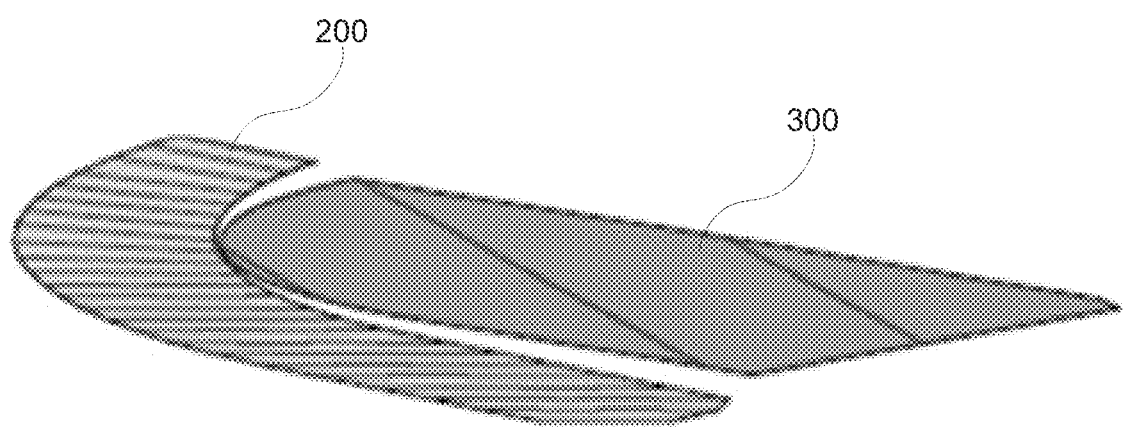
FIG. 1 is a graphical representation of an isometric view of two areas, having different elevation, relatively positioned next to one another, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms: "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

One of the objectives of the present disclosure is (providing) enhancing commercially available BIM software with tools for solving design problems of structures generally encountered in variable planes environments.

Referring now to FIG. 1, depicting an isometric view of two areas in a given terrain, having different elevation, relatively positioned next to one another, in accordance with some exemplary embodiments of the disclosed subject matter. Areas 200 and 300 may be a digital graphic representation of two planes each having different elevation that are positioned adjacently. In some exemplary embodiments, area 200 or area 300 can be a topographic representation of a terrain, a sidewalk, a road, existing structure, and any combination thereof, or the like. It should be noted that, digital representation (information) of areas, such as areas 200 and 300 may be retained in and retrieved from a storage of the present disclosure (to be described in detail further below).

Figure 2:
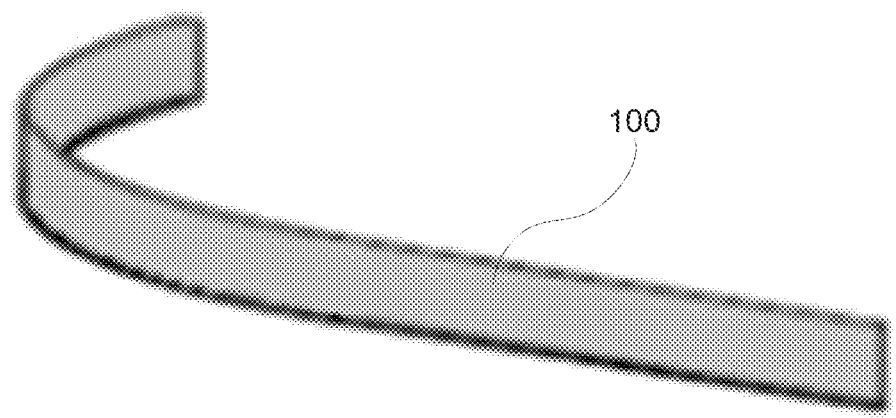
FIG. 2 is a graphical representation of an isometric view of a structure (solid) to be integrated between the two areas, in accordance with some exemplary embodiments of the disclosed subject matter.

Referring now to FIG. 2, depicting a graphical representation of an isometric view of structure 100 to be integrated between the two areas, in accordance with some exemplary embodiments of the disclosed subject matter. Structure 100 may be a digital graphic representation of a civil engineering structure, also known as solid in the BIM jargon. In some exemplary embodiments, Structure 100 may be a wall, a floor, a ceiling, stairs, building foundation, a fence, and any combination thereof, or the like. It should be noted that, digital representation (information) of solids, such as, for example, structure 100 may be retained in and retrieved from a repository of the present disclosure (to be described in detail further below).

Figure 3:
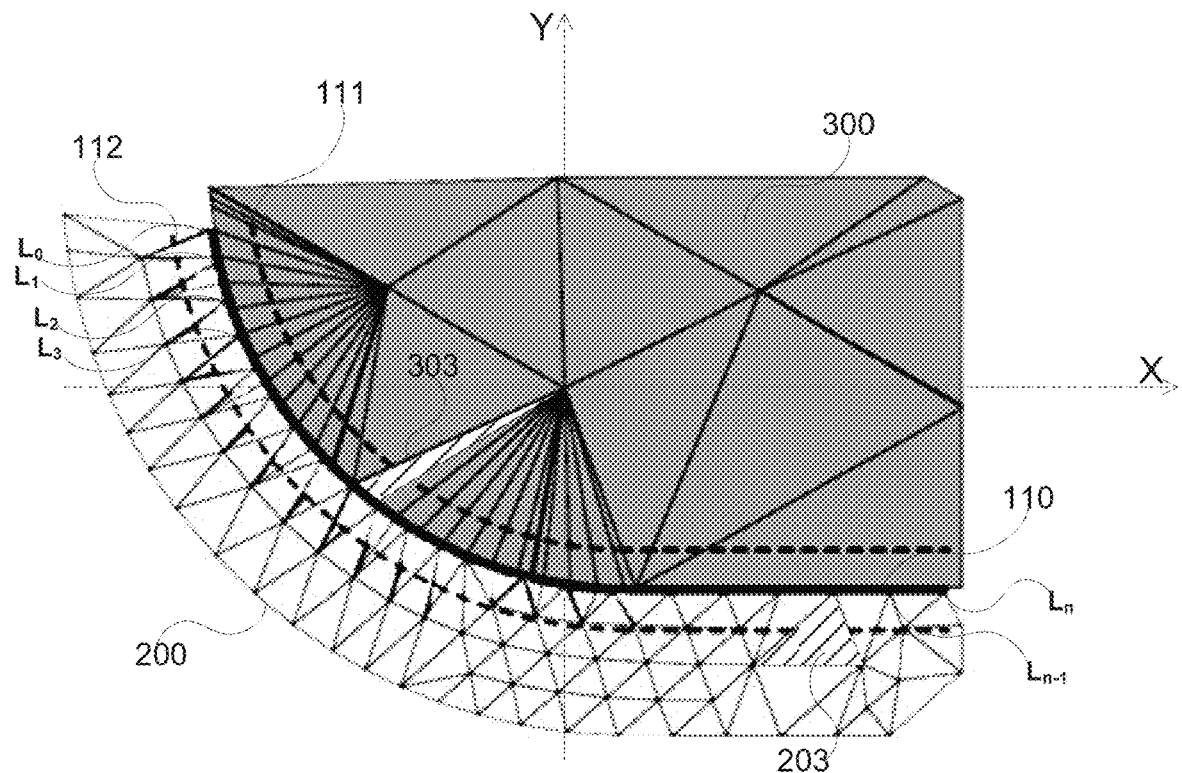
FIG. 3 illustrates a topographic representation of the two areas and the structure, in accordance with some exemplary embodiments of the disclosed subject matter.

Referring now to FIG. 3, depicting a graphical representation of a top view of the two adjacent areas 200 and 300, in accordance with some exemplary embodiments of the disclosed subject matter. FIG. 3 also shows a desired wall path 110 and two auxiliary lines 111 and 112, situated on opposite sides of wall path 110.

It will be noted that areas, such as the areas 200 and 300 of the example depicted in FIG. 3, may require segmenting the wall 100 into sections with relatively height differences between the sections due to the elevation differences. To connect between the sections to allow construction machinery and vehicles to move between the sections, excavation slopes are generally formed. The angle of the excavation slopes is generally determined by a design engineer (user). In some exemplary embodiments, the user can determine two auxiliary lines 111 and 112. Auxiliary line 111 may be parallel to one side of wall path 110, whereas auxiliary line 112 may be parallel to the opposite side of wall path 110. Alternatively, due to design constrains, the user may draw auxiliary lines that are necessarily parallel to wall path 110. In some exemplary embodiments, each auxiliary line marks (in the X-Y plane of the area) the place in which a reference elevation outline (Z coordinate) is determined, for each side of the wall.

In some exemplary embodiments, a known in the art, topography triangulation may be used for dividing areas 200 and 300 into sub-sections, such as triangles 303 and 203. Each sub-section can be a representation of a continuous surface consisting entirely of triangular facets, used mainly as discrete global grid in primary elevation modeling. That is to say, that each triangular facet, such as triangles 303 and 203, has a constant sloop. It should be noted that, the a commercially available BIM is capable of forming a plurality of triangles, such as triangles 303 and 203, for areas 200 and 300 particularly along wall path 110. In some exemplary embodiments, vertexes (labeled $L_0$, $L_1$, $L_2$, $L_3 \ldots L_n$) of each tringle base may be align against a desired path of wall path 110. It will be understood that, the length (L) of each base vary along the wall path.

In some exemplary embodiments, the BIM software of the present disclosure may acquire terrain (topography) records of geographic information system, global positioning system, photogrammetry, or the like for creating spot elevations triangles, such as triangles 303 and 203.

Figure 4:
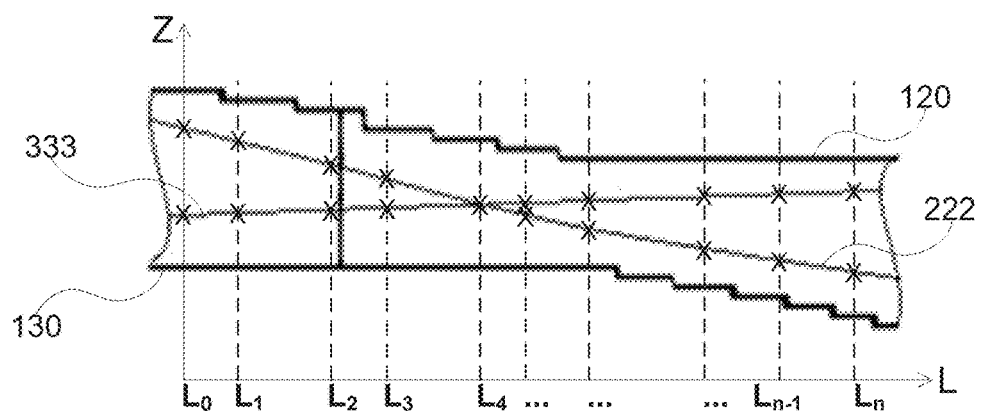
FIG. 4 illustrates an elevation outline of the areas along the structure (unfold), in accordance with some exemplary embodiments of the disclosed subject matter.

Referring now to FIG. 4, depicting a graphical representation of an elevation outline of areas along the structure, in accordance with some exemplary embodiments of the disclosed subject matter. Elevation outline 222 depicts the elevation outline of area 200 along auxiliary line 111 and elevation outline 333 depicts the elevation outline of area 300 along auxiliary line 112. In some exemplary embodiments, top line 120 illustrates the determined top line of wall (structure) 100, whereas bottom line 130 illustrates the determined bottom line of wall 100. It should be noted that, bottom line 130 may be under the surface of area 200, area 300 or both. It should also be noted that, bottom line 130 can mark the excavation depth for constructing the wall 100.

It will be noted that, FIG. 4 can be viewed as an unfold representation of wall 100, where the length of wall 100 can be represented along the L axis vs. height along the Z axis. In some exemplary embodiments, the L axis can be segmented to segments marked $L_0$ through $L_n$, wherein the length of each segment may be defined by sub-sections areas 200 and 300 (to be described in detail further below).

In some exemplary embodiments, elevation outlines 222 and 333 can each be represented by their heights at base vertexes (points) $L_0$ through $L_n$ along the L axis. It should be noted that, the heights of the elevation outlines may be given with respect to either an arbitrary horizontal plane or known horizontal plane, such as sea-level, floor, or the like.

Figure 5:
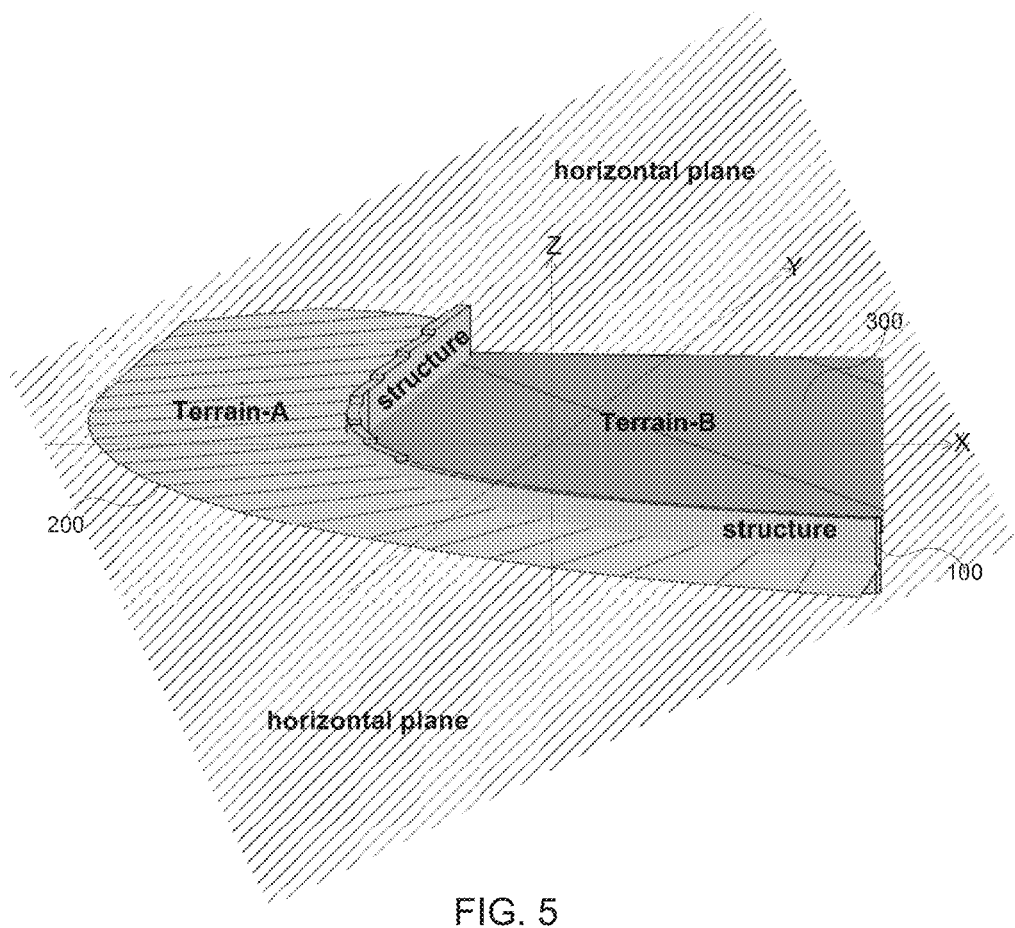
FIG. 5 illustrates an isometric view of the structure integrated between the two areas, in accordance with some exemplary embodiments of the disclosed subject matter.

Referring now to FIG. 5, depicting a graphical representation of an isometric view of the structure (wall) 100 integrated between area 200 (terrain-A) and area 300 (terrain-B), in accordance with some exemplary embodiments of the disclosed subject matter. FIG. 5 can be viewed as a graphic representation outcome of the method of the present disclosure.

Figure 6:
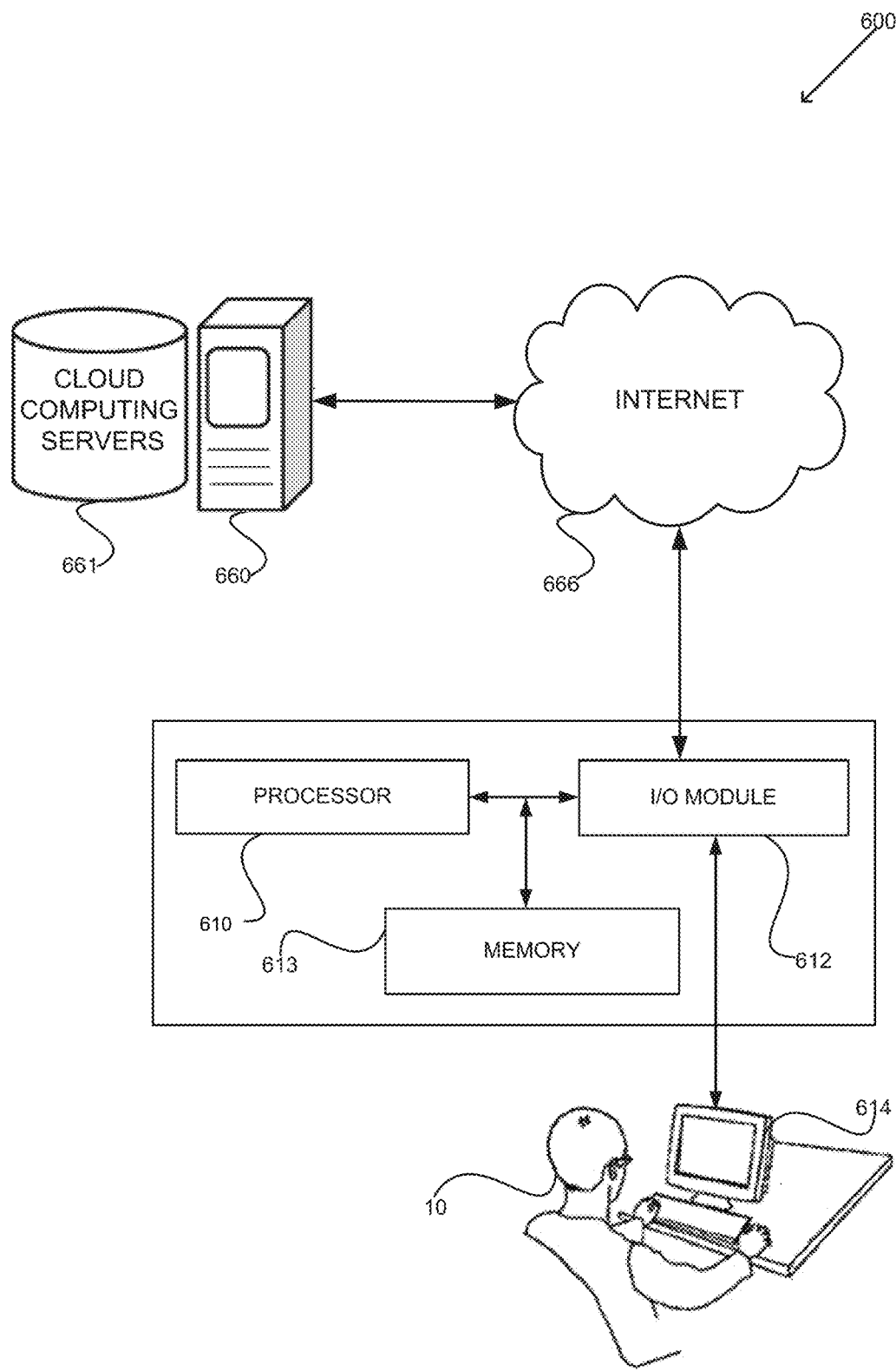
FIG. 6 shows a block diagram of a system for executing a method of modeling the structure, in accordance with some exemplary embodiments of the disclosed subject matter.
Figure 9:
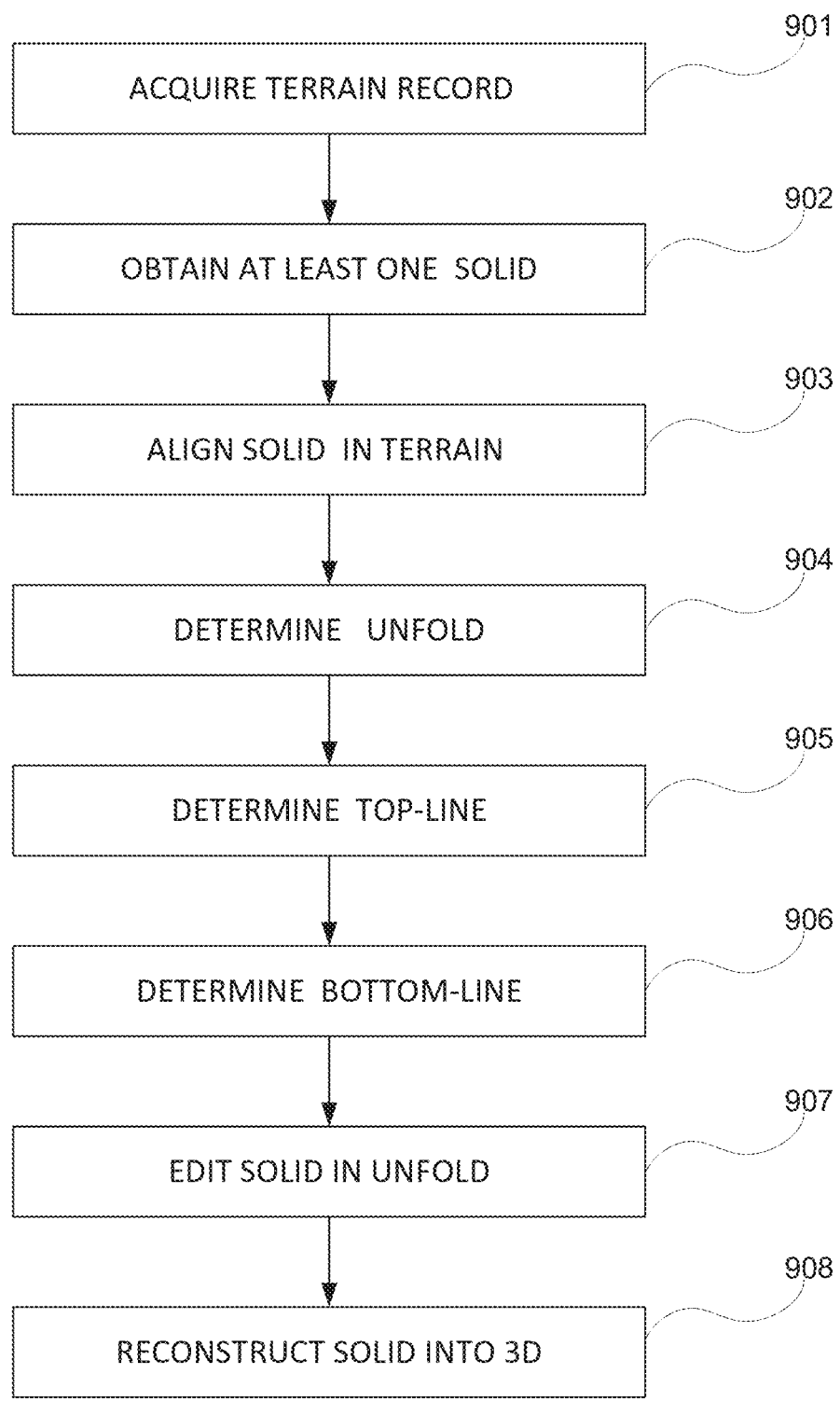
FIG. 9 shows a flowchart diagram for executing a method of modeling the structure, in accordance with some exemplary embodiments of the disclosed subject matter.

Referring now to FIG. 6 showing a block diagram of a system 600 for executing a method of modeling the structure, in accordance with some exemplary embodiments of the disclosed subject matter. System 600 may be a computerized system adapted to perform methods such as depicted in FIG. 9.

In some exemplary embodiments, system 600 may comprise a processor 610, the processor 610 can be a central processing unit (CPU), a microprocessor, an electronic circuit, an integrated circuit (IC) or the like. Additionally, or alternatively, processor 610 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processor 610 may be utilized to perform computations required by system 600 or any of its subcomponents.

In some exemplary embodiments of the disclosed subject matter, System 600 may comprise an input/output (I/O) module 612. System 600 may utilize I/O module 612 as an interface to transmit and/or receive information and instructions between system 600 and external I/O devices, such as a workstation 614, the Internet 666, or the like.

In some exemplary embodiments, I/O module 612 may be used to provide an interface to a user 10 of the system, such as by providing output, visualized results, reports, or the like. User 10 may use workstation 614 to input the information, such as parameters and dimensions also workstation 614 can be utilized by user 10 for manipulating drawings by using graphic user's interface (GUI).

In some exemplary embodiments, internet connection 666 can facilitate communication between processor 610 with cloud computing server/system (CCS) 660 that comprise a database storage 661. In some exemplary embodiments, the CCS may be deployed and implemented on a propriety cloud computing, such as amazon web services (AWS) having increased flexibility and scalability, or the like.

In some exemplary embodiments, system 600 may comprise a memory 613. Memory 613 may be persistent or volatile. For example, memory 605 can be a flash disk, a random access memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as flash device, memory stick, or the like.

In some exemplary embodiments, memory 605 or database storage 661 or both may be used as repository for retaining information, such as commercially available BIM software; topography (terrain) digital representation; digital maps, digital representation of solids (i.e. civil engineering structures); geographic information system (GIS); representation of data acquired by the GIS and any combination thereof, or the like. Additionally, the repository, i.e. memory 605 and or database storage 661, can retain program code configured to perform acts associated with any of the steps shown in FIG. 9. It should be noted that, the repository can retain all or a portion of the information, the software and the program code required for executing the method of the present disclosure. However, all the software components, i.e. information software and the program code, shall be available to system 600 as a storage.

In some exemplary embodiments, the storage retains software components configured to activate processor 610, CCS 660, and a combination thereof to perform acts associated with any of the steps shown in FIG. 9. The software components may be implemented as one or more sets of interrelated computer instructions, executed for example by processor 602 or by CCS 660 or both. The components may be arranged as one or more executable files, dynamic libraries, static libraries, methods, functions, services, or the like, programmed in any programming language and under any computing environment.

One technical problem dealt with by the disclosed subject matter is that commercially available BIM software requires the user to manually determine the structure elevation planes based on height points. This is done, on a trial by error basis, by manually placing a plurality of points at arbitrary distances along the unfolded solid profiles and defining a height for each of the points based on its approximate location along the unfold path.

Yet another technical problem dealt with by the disclosed subject matter is that commercially available BIM software are lacking the capability editing an unfold representation in designing curved walls. Which will require resetting the design to its initial input form for edits such as, openings, structure type, structure width, and any combination thereof, or the like.

One technical solution is providing for structures, such as wall 100, to be modeled by selecting reference planes located near the wall and using height information with respect to the reference planes to define the height of the top of the wall and the height of the base of the wall. In some exemplary embodiments, the reference planes may be selected from objects such as, for example, a floor, topography, a ceiling, stairs, or any combination thereof. The walls may be modeled so that the top of the wall is at a constant height relative to the reference frame, or alternatively, modeled so that the height varies relative to the reference frame (e.g. arranged in steps).

One technical solution is providing for automatic verification of an angle of excavation slopes selected by the user is suitable by measuring the height of a plurality of adjacent points on the slope. In some exemplary embodiments, either a section of the excavation slope or a height of a section of the wall can be automatically adjusted in order to maintain the desired angle.

One technical solution is providing for an unfold edit module that allows for existing curved walls to be edited without having to restart the wall design process from the beginning, based on generating a 2D model of the 3D curved wall. This may be done essentially by using parameters associated with the shape of the wall and the coordinates of the wall auxiliary lines including any openings to unfold the 3D curved wall into a 2D flat wall.

One technical effect of utilizing the disclosed subject matter is that the unfolding method consists of first determining the path of the wall. This information may generally be obtained from the BIM system database or may be obtained as a projection of the wall along the X-Y axis in 3D space. The length of the path may then be taken along the L axis in 2D space. The Z-axis (vertical) coordinates of all wall boundary points may then be taken as Y-axis coordinates in 2D space. The result is the 3D curved wall being displayed in 2D space (X-Y axis) where the starting point along the L-axis corresponds with the starting point of the path of the wall, and the Y axis starts at zero. Modifications may then be made to the 3D wall by editing the 2D wall while maintaining the same length of the projection along the X-axis.

Figure 7:
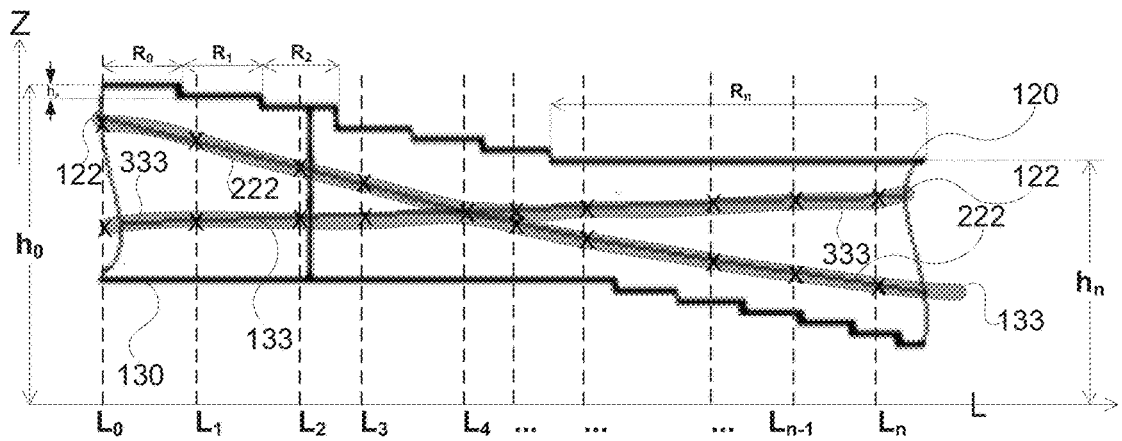
FIG. 7 illustrates an unfold representation of an elevation outline of the areas along the structure, in accordance with some exemplary embodiments of the disclosed subject matter.

Referring now to FIG. 7 illustrating an unfold representation of an elevation outline of the areas along the structure 100, in accordance with some exemplary embodiments of the disclosed subject matter. FIG. 7 also shows high elevation outline (HEO) 122 and low elevation outline (LEO) 133. In some exemplary embodiments, HEO 122 is a line incorporating highest points of elevation outlines 222 and 333, whereas LEO 133 is a line incorporating lowest points of elevation outlines 222 and 333. Thus, HEO 122 is weighting areas 200 and 300 highest elevation, i.e. impacting top line 120 outline, whereas LEO 133 is weighting areas 200 and 300 lowest elevation, i.e. impacting bottom line 130 outline.

Similar to FIG. 4, FIG. 7 is an unfold view of the structure and the terrain around it, which is equivalent to a side view representation, where Z represents the elevation axis (vertical) and L represents the length f the unfolded structure. In some exemplary embodiments, R0 thru Rn indicates a, to be determine, length of each step in the structure. $[h_s]$ labels a height of the step, typically having a constant height along the structure, $h_s$ may be arbitrary defined by the user. Additionally, or alternatively, the height [h], i.e., top of the structure may also be defined by the user.

Figure 8:
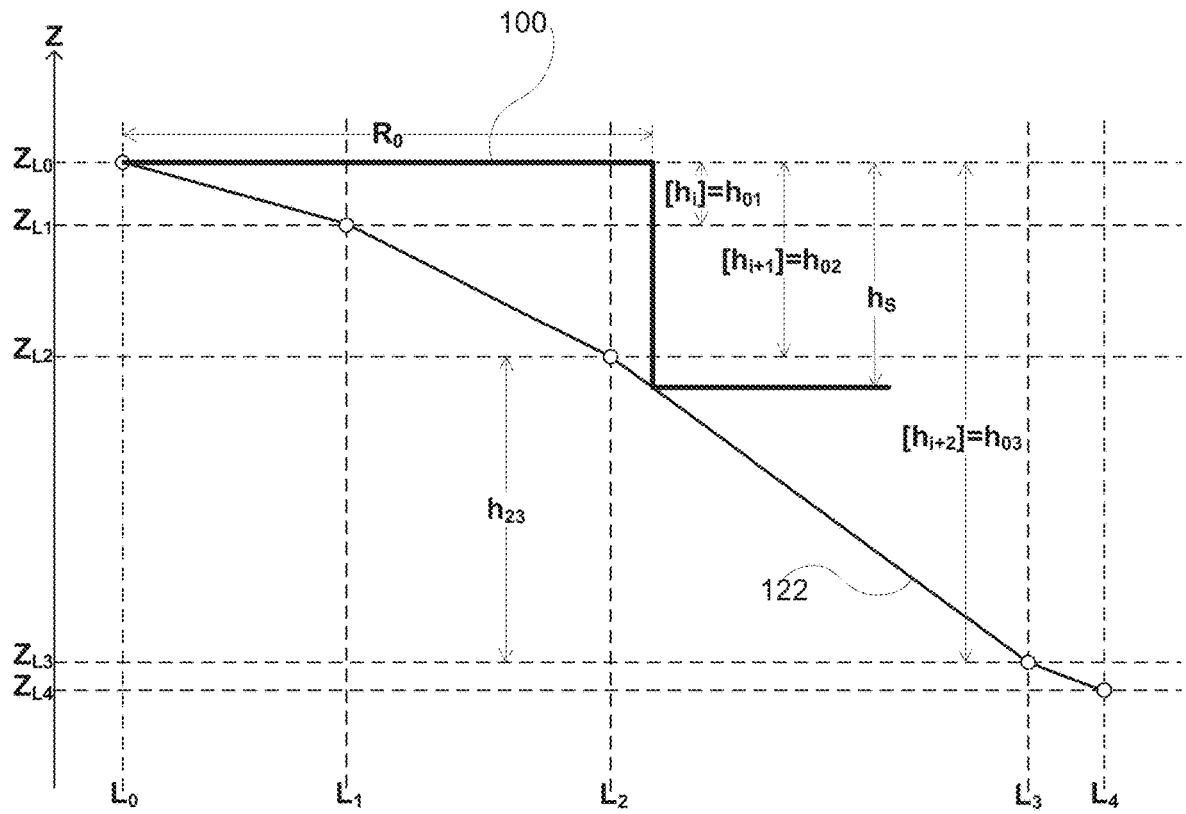
FIG. 8 illustrates a design sketch of a step in the structure, in accordance with some exemplary embodiments of the disclosed subject matter.

FIG. 8 illustrates a design sketch of a step in the structure, in accordance with some exemplary embodiments of the disclosed subject matter;

In some exemplary embodiments, $Z_{L0}$ marks the elevation at point $L_0$; $Z_{L1}$ marks the elevation at point $L_1$; $Z_{L2}$ marks the elevation at point $L_2$; $Z_{L3}$ marks the elevation at point $L_3$; $Z_{L4}$ marks the elevation at point $L_4$ and $h_s$ is a step height (preset). Ergo, $h_{01}=Z_{L0}-Z_{L1}$; $h_{02}=Z_{L0}-Z_{L2}$; $h_{03}=Z_{L0}-Z_{L3}$; $h_{23}=Z_{L2}-Z_{L3}$ and $\Delta h=h_s-h_{02}$. Thus, $R_0$ can be determined by: $R_0=L_2-L_0+(L_3-L_2)/h_{23}*\Delta h$.

Referring now to FIG. 9, showing a flowchart diagram for executing the method for modeling the structure, in accordance with some exemplary embodiments of the disclosed subject matter.

In step 901, a terrain record may be acquired from the system 600 repository. In some exemplary embodiments, the terrain record comprises topography triangulation that divide the terrain into sub-sections, such as triangles 303 and 203, of FIG. 3. Where each sub-section is a representation of a continuous surface consisting entirely of triangular facets, used mainly as discrete global grid in primary elevation modeling.

In step 902, at least one solid (structure) representation may be obtained from the system 600 repository. In some exemplary embodiments, the solid may be a structure, such as structure 100, which is can be a digital representation (numeric or graphic) of a civil engineering structure. The solid, (structure 100) may be a wall, a floor, a ceiling, stairs, building foundation, a fence, a road, a sidewalk, a bridge and any manmade structure.

In step 903, a solid may be aligned in the terrain. In some exemplary embodiments, the user may utilize the BIM software for aligning the solid by marking the path 110 in a graphical representation, such as depicted in FIG. 3. Additionally, or alternatively, the user may also determine and mark auxiliary lines 111 and 112, of FIG. 3, which are situated on opposite sides of path 110, however parallel to the path. It should be noted that, that in the example of the embodiment of FIG. 3, path 110 serves as partition that divides the terrain into areas 200 and 300, wherein each side of the path 110 can have different elevation.

In step 904, an unfold representation, such as illustrated in FIG. 4, may be determined. In some exemplary embodiments, the unfold is a two (Z by L) dimensional, vertical by length representation, that depicts a. The elevation outlines (222, 333) of areas 200 and 300 as measured along auxiliary lines 112 and 111 respectively.

b. Top-line 120 marks a desired elevation of structure 100 and bottom-line 130 marks a desired elevation of structure 100.

Note that, calculation of the desired elevations of structure 100, i.e., top-line 120 and bottom-line 130 elevations are described in the following step (905).

In some exemplary embodiments, the elevation (height), marked with (x) in FIG. 4, of elevation outlines (222, 333) are measured at discreet points $L_0$ to $L_n$ that are previously described with reference to FIG. 4.

It should be noted that, the L coordinate marks the entire length of path 110, where $L_0$ may be viewed as the starting point of structure 100 and $L_n$ as the end point of structure. It should also be noted that, a starting point elevation $[h_0]$ and the ending point elevation $[h_n]$ of structure 100, as well as the step height $[h_s]$ (shown in FIG. 7) may be arbitrary defined by the user as part of design considerations. Heights $h_0$ and $h_n$ may be given with respect to either a predetermine or arbitrary reference planes.

In step 905, a solid's top-line may be determined. In some exemplary embodiments, structure 100 (solid) may be modeled so that the top-line of the solid is at a constant elevation relative to the reference frame, or alternatively, modeled so that the elevation varies relative to the reference frame. The determination of the solid's top-line may be a sequential calculation of each step length, $R_0$ trough $R_n$. In the exemplary embodiment depicted in FIG. 8, $R_0$ may be given by the following equation $R_0 = L_2 - L_0 + (L_3 - L_2)/h_{23} * \Delta h$. Wherein the calculation is repeated sequentially for the following steps $R_i$ all the way to the last step $R_n$.

In some exemplary embodiments, prior to each step calculation the method of the present disclosure determines if $h_s > h_i$, if yes, does $h_s > h_{i+1}$ and so on until $h_s$ doesn't. In the example depicted in FIG. 8 the calculation of the step length $R_i$ may be invoked upon determining that $h_s$ is not greater than $h_{i+2}$, thus when the step height is smaller than the outline elevation increment.

In step 906, a solid's bottom-line may be determined. In some exemplary embodiments, structure 100 (solid) may be modeled so that the bottom-line of the solid is at a constant height relative to the reference frame, or alternatively, modeled so that the height varies relative to the reference frame, which dictates excavation depth for the structure enforcement. It will be clear to a person having ordinary skill in the art that the bottom-line may be determined in the same manner described above (step 905), however, in a negative direction.

It should be noted that, an unfold module may be determined from an existing three-dimensional (3D) (isometry) design of a structure in a given terrain, such as depicted in FIG. 5.

In step 907, unfold representation of the solid can be edited. In some exemplary embodiments, whether the two dimensions unfold was determined from scratch or determined from a 3D design, the unfold presentation (see FIG. 7) can be edited by utilizing the method of the present disclosure. In some exemplary embodiments, the unfold module can be edited without having to restart the wall design process from the beginning, based on generating a 2D model of the 3D curved wall. This may be done by using parameters associated with the shape of the solid and the coordinates of the auxiliary lines including any openings to unfold the 3D curved wall into a 2D flat wall. In some exemplary embodiments, the editing can comprise modifying the solid shape, width, elevation, incorporating additional solids, create openings in the structure and any combination thereof, or the like.

In step 908, an edited solid may be reconstruct into three-dimension (isometric) representation, such as FIG. 5. In some exemplary embodiments, any modifications, such as depicted in step 907, made to the unfold model can be reflected into the 3D presentation, of FIG. 5, while maintaining the same length and the desired elevation of the solid in the terrain.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. A method for modeling a structure in variable terrain using a building information modeling system configured to acquire a terrain representation, the method comprising:
    obtaining a representation of the structure having a length and modeling the structure into the terrain;
    determining an unfold of the structure;
    determining a top line and a bottom line of the unfold;
    editing the unfold to yield an edited unfold; and
    repeating said modeling the structure into the terrain based on the edited unfold,
    wherein said determining an unfold of the structure further comprises segmenting the length of the structure based on two- or three-dimensional triangulation configured to divide the terrain that is adjacent to the structure into sub-sections, and wherein the sub-sections are comprised of sub-sections on each side of the structure.

2. The method of claim 1, wherein the terrain and the structure representation comprise two- and three-dimension graphical and numeric representations.

3. The method of claim 1, wherein the modeling the structure into the terrain further comprises two- and three-dimension graphical and numeric representations of the structure and the terrain.

4. The method of claim 1, wherein the terrain is an area selected from the group consisting of landscape, sidewalk, road, existing structure, and any combination thereof.

5. The method of claim 1, wherein the terrain representation is selected from the group consisting of records of geographic information system, global positioning system, photogrammetry, computer aided design files, and any combination thereof.

6. The method of claim 1, wherein the structure is a digital representation of a civil engineering structure selected from the group consisting of wall, floor, ceiling, stairs, building foundation, fence, road, sidewalk, bridge, and any combination thereof.

7. The method of claim 1, wherein said determining top and bottom lines of the unfold is determining an elevation of a top line and a bottom line of the structure at each segment, and wherein said determining an elevation takes into consideration elevations of the terrain that is adjacent to the structure.

8. The method of claim 1, wherein said editing the unfold is editing the structure by editing the unfold of the structure, and wherein the editing forms an edited structure.

9. The method of claim 8, wherein the editing structure is selected from the group consisting of changing physical detentions of the structure, adding an additional structure to the structure, omitting a portion of the structure, and any combination thereof.

10. The method of claim 8, wherein said repeating said modeling the structure into the terrain based on the edited unfold is reconstructing the modeling with the edited structure, and wherein reconstructing the modeling is a digital representation outcome selected from the group consisting of two-dimensional graphic representation, three-dimensional graphic representation, numeric representation, and any combination thereof.

* * * * *